US007382691B2

(12) United States Patent
Capozzi et al.

(10) Patent No.: US 7,382,691 B2
(45) Date of Patent: Jun. 3, 2008

(54) MULTIFUNCTION WATCH SYSTEM AND METHOD

(75) Inventors: Matt Capozzi, Oceanside, CA (US); Matt Landman, Encinitas, CA (US)

(73) Assignee: Nixon, Inc., Encinitas, CA (US)

( * ) Notice: Subject to any disclaimer, the term of this patent is extended or adjusted under 35 U.S.C. 154(b) by 99 days.

(21) Appl. No.: 11/409,390

(22) Filed: Apr. 21, 2006

(65) Prior Publication Data
US 2007/0247976 A1 Oct. 25, 2007

(51) Int. Cl.
*G09G 5/00* (2006.01)
(52) U.S. Cl. .......................... 368/10; 368/11; 368/69; 715/786; 715/295; 715/69
(58) Field of Classification Search ................ 368/10, 368/11, 69; 345/786, 701; 715/786, 295, 715/69
See application file for complete search history.

(56) References Cited

U.S. PATENT DOCUMENTS

| 6,477,117 | B1 * | 11/2002 | Narayanaswami et al. .. 368/251 |
| 6,525,997 | B1 * | 2/2003 | Narayanaswami et al. .. 368/223 |
| 6,556,222 | B1 * | 4/2003 | Narayanaswami .......... 715/786 |
| 6,678,535 | B1 * | 1/2004 | Narayanaswami .......... 455/557 |
| 7,081,905 | B1 * | 7/2006 | Raghunath ................. 345/684 |
| 7,113,450 | B2 * | 9/2006 | Plancon et al. ............... 368/10 |
| 2002/0101457 | A1 * | 8/2002 | Lang ........................... 345/856 |
| 2005/0007337 | A1 * | 1/2005 | Sellen et al. ................. 345/156 |
| 2006/0035628 | A1 * | 2/2006 | Miller et al. .............. 455/414.3 |
| 2006/0139320 | A1 * | 6/2006 | Lang ........................... 345/156 |
| 2006/0285442 | A1 * | 12/2006 | Maeder ........................ 368/11 |
| 2007/0107014 | A1 * | 5/2007 | Howard et al. ................ 725/44 |
| 2007/0153633 | A1 * | 7/2007 | Plancon et al. ............... 368/11 |

FOREIGN PATENT DOCUMENTS

| EP | 1 832 969 A | 9/2007 |
| WO | 01/86357 A | 11/2001 |

* cited by examiner

*Primary Examiner*—Gary F. Paumen
(74) *Attorney, Agent, or Firm*—Pillsbury Winthrop Shaw Pittman LLP

(57) ABSTRACT

A multifunction watch provides plural worlds, each world supporting one or more modes of operation within the world. Separate configurations can be maintained for each world and separate navigation menus can be provided for each world. Modes of operation may be configurable. Duplicate worlds and duplicate modes within worlds are provided. In certain embodiments a desired world can be selected by manipulating a bezel. In some embodiments the bezel rotates to engage and activate one of a plurality of switches, thereby selecting a corresponding world. Each world operates independently of other worlds and some functions can be shared between worlds and between modes within worlds. An example is described in which a multimode watch provides four worlds including TIME, RIDE, COMPASS and SPEED.

24 Claims, 7 Drawing Sheets

TIME 72 →

| DEFAULT STATE | | LIGHT | MODE/SET | START/STOP/+ | LAP/RESET |
|---|---|---|---|---|---|
| TIME | PRESS ONCE | LIGHT ON | TO CHRONO | VIEW T2 | TOGGLE HOURLY CHIME ON/OFF |
| | HOLD | — | — | TOGGLE T2 | TOGGLE KEYTONE ON/OFF |
| TIMER | PRESS ONCE | LIGHT ON | TO ALARM | START/STOP | SCROLL PRESETS |
| | HOLD | — | — | — | RESET |
| CHRONO | PRESS ONCE | LIGHT ON | TO TIMER | START/STOP | LAP |
| | HOLD | — | — | — | RESET |
| ALARM | PRESS ONCE | LIGHT ON | TO TIME | ALARM ON/OFF | SCROLL ALARM TYPES |
| | HOLD | — | — | — | — |

| SETTING STATE | LIGHT | MODE/SET | START/STOP/+ | LAP/RESET/- |
|---|---|---|---|---|
| PRESS ONCE | LIGHT ON | NEXT FIELD | INCREMENT | DECREMENT |
| HOLD | — | CONFIRM/EXIT | FAST INCREMENT | FAST DECREMENT |

RIDE 74 →

| DEFAULT STATE | | LIGHT | MODE/SET | START/STOP/+ | LAP/RESET |
|---|---|---|---|---|---|
| RIDE | PRESS ONCE | LIGHT ON | SCROLL RIDE TYPES / TO RECORDS | START/STOP RECORDING | — |
| | HOLD | — | — | — | RESET COUNTER and SAVE RECORD |
| RECORDS | PRESS ONCE | LIGHT ON | TO RIDE | MOVE UP RECORDS LIST | MOVE DOWN RECORDS LIST |
| | HOLD | — | — | VIEW/EXIT RECORD | ERASE RECORD or ERASE ALL RECORDS |

COMPASS 76 →

| DEFAULT STATE | | LIGHT | MODE/SET | START/STOP/+ | LAP/RESET |
|---|---|---|---|---|---|
| COMPASS | PRESS ONCE | LIGHT ON | TO REF ALTI | START/STOP RECORDING | — |
| | HOLD | — | — | — | RESET COUNTER and SAVE RECORD |
| REF ALTI | PRESS ONCE | LIGHT ON | TO COMPASS DECLINATION | INCREMENT | DECREMENT |
| | HOLD | — | — | FAST INCREMENT | FAST DECREMENT |
| COMPASS DECLINATION | PRESS ONCE | LIGHT ON | TO COMPASS CALIBRATION | INCREMENT | DECREMENT |
| | HOLD | — | — | FAST INCREMENT | FAST DECREMENT |
| COMPASS CALIBRATION | PRESS ONCE | LIGHT ON | TO COMPASS | START/STOP CALIBRATION | — |
| | HOLD | — | — | — | — |

SPEED 78 →

| DEFAULT STATE | | LIGHT | MODE/SET | START/STOP/+ | LAP/RESET |
|---|---|---|---|---|---|
| SPEED | PRESS ONCE | LIGHT ON | TO SLOPE | START/STOP RECORDING | — |
| | HOLD | — | — | — | RESET COUNTER and SAVE RECORD |
| SLOPE | PRESS ONCE | LIGHT ON | TO RECORDS | LOCK SLOPE ANGLE | — |
| | HOLD | — | — | — | — |
| RECORDS | PRESS ONCE | LIGHT ON | TO SPEED | MOVE UP RECORDS LIST | MOVE DOWN RECORDS LIST |
| | HOLD | — | — | VIEW/EXIT RECORD | ERASE RECORD or ERASE ALL RECORDS |

Figure 7

MULTIFUNCTION WATCH SYSTEM AND METHOD

BACKGROUND OF THE INVENTION

1. Field of the Invention

The present invention relates generally to watches and more particularly to multifunction watches.

2. Description of Related Art

Watches are commonly available that provide a variety of modes of operation. For example, digital watches generally include time-of-day, alarm clock and stopwatch functions. However, most watches have limited input and display capabilities due to limited space and limitations of user dexterity. In order to expand watch functionality, crude menuing systems are often implemented to allow users to sequentially select parameters for configuring watches. However, current menuing techniques bring limited benefit when complex and diverse functions must be programmed and navigation of resulting menus is increasingly time-consuming, overly complex and non-intuitive.

BRIEF SUMMARY OF THE INVENTION

Embodiments of the present invention provide a multifunction watch in which plural worlds are defined, each world supporting one or more modes of operation within the world and wherein each world includes a menu distinct from menus of the other worlds. In certain embodiments, modes of operation are configurable. In certain embodiments, configurable modes of operation of a given world are distinctly configurable with respect to modes of operation in other worlds. In certain embodiments a desired world can be selected by manipulating a bezel. In some embodiments the bezel rotates to engage and activate one of a plurality of switches, thereby selecting a corresponding world. In certain embodiments, navigation between worlds is controlled substantially or exclusively by one switching device, preferably a manipulable bezel capable of engaging and actuating any of a plurality of distinct switches for selecting corresponding worlds. In many embodiments, each world operates independently of other worlds. In one example, a multimode watch provides four worlds including TIME, RIDE, COMPASS and SPEED worlds. In some embodiments, the multifunction watch can provide environments customized for each of the provided worlds. Typically, each world can format and populate a display and assign functionality to inputs such as switches and buttons. In many embodiments, certain inputs provide similar functionality across some or all worlds.

BRIEF DESCRIPTION OF THE DRAWINGS

The structural and functional aspects of the invention will become understood by those skilled in the art by reference to the following detailed description when taken in conjunction with the appended drawings, in which:

FIG. 7 is a table identifying switch functions in an example of an embodiment of the invention.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention. Where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration.

Certain embodiments of the present invention comprise a multifunction watch providing a plurality of worlds wherein each world can operate independently of the other worlds. In many embodiments, each world defines at least one mode of operation of the multifunction watch. In these embodiments, a mode of operation can provide sets of operations, functions and displays. In some embodiments, multiple instances of a mode can be provided to support, for example, plural time zone tracking, multiple timers, and so on. In certain embodiments, at least some operations and functions of the modes of a world have at least one common characteristic. For example, in a TIME world, modes of operation may include a clock, one or more timers, one or more alarm clocks and a chronograph. It will be appreciated that a common characteristic of each of the modes of operation in this example is a measurement of time.

Figure 1:
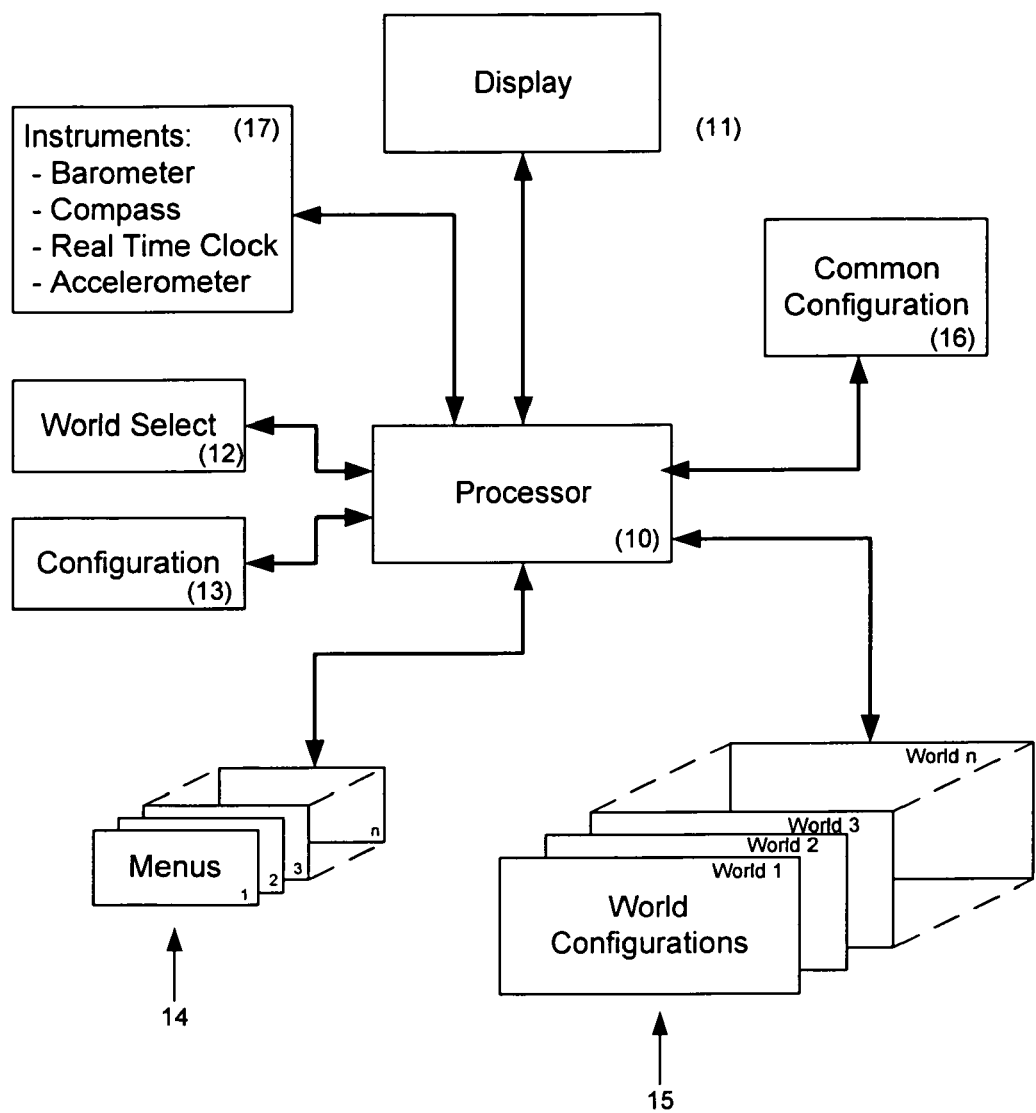
FIG. 1 is a block diagram representing one embodiment of the invention.

As depicted in FIG. 1, in many embodiments, separate configurations 15 for plural worlds can be maintained. In certain embodiments, a processor 10 maintains the configurations 15 in storage, typically in a combination of volatile and non-volatile memory. Configurations 15 may be modified or accessed by navigating a corresponding menu 14. Typically each menu 14 is associated with a single corresponding configuration 15. In many embodiments, access to a configuration and menu is provided only when the configuration and menu relate to a currently selected world. In many embodiments, configuration of a first world typically does not affect configuration of a second world. In certain embodiments, selection of a world is made using selection controls 12 as will be discussed in more detail later. Navigation within a world is typically effected using configuration controls 13 as will be discussed in more detail later.

In at least some embodiments, a common configuration 16 can be maintained for all worlds. Typically, a common configuration 16 maintains components, elements and functions that apply in all worlds. Examples of common elements can include language selection, certain calibration values and certain user interface selections such as timeout values. Examples of functions include timers, alarms, messaging functions and menu navigation functions. In many embodiments, common functions may be provided for use in more than one world and, in some of these embodiments, operation of the function in any one world can be controlled using configuration information provided by the one world.

In certain embodiments identical worlds may be provided and maintained separately. For example, a first TIME world could be configured for a U.S. time zone such as Pacific Standard Time ("PST") while a second TIME world could be configured for a European time zone such as Greenwich Mean Time ("GMT"). In this example, alarms, and timers provided by the two TIME worlds can be maintained separately.

In one example, a multimode watch may support four worlds, including TIME, RIDE, COMPASS and SPEED worlds. In many embodiments, each world can format and populate a display and configure and control inputs such as switches and pushbuttons. In many embodiments, certain inputs can provide similar functionality across some or all of the worlds. For example, in many embodiments, a mode switch can be provided that operates in each world to control configuration within that world. Operation of the worlds and associated functions is described in greater detail below.

Figure 2:
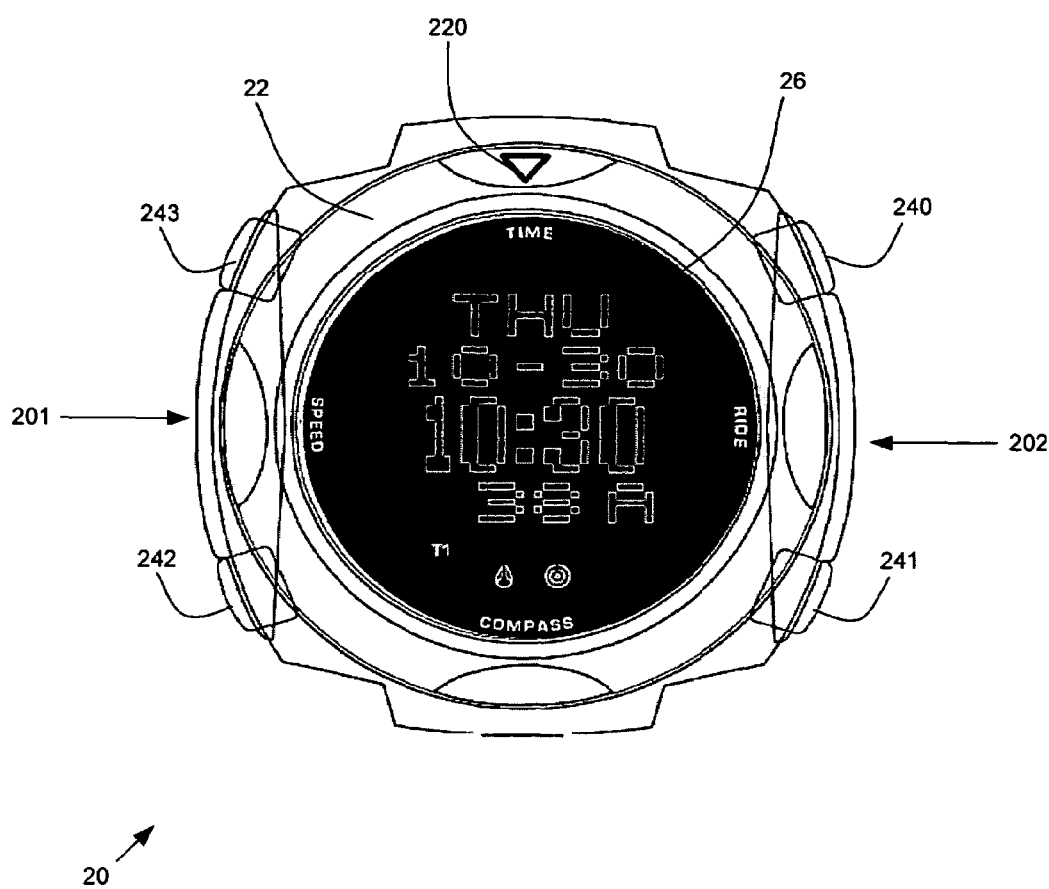
FIG. 2 depicts an example of a multifunction watch.

Referring now to FIG. 2, one example of a multifunction watch is shown generally at 20, where the watch comprises a bezel 22 and a plurality of control switches 240, 241, 242 and 243 located at selected positions on the watch face. Locations of control switches 240-243 are selected for easy access by a wearer of the watch. In the example of FIG. 2, four control switches 240-243 are located on two sides of the watch at maximal separation.

More than four control switches 240-243 can be provided based on supported watch functions and associated programming needs. Fewer than four control switches 240-243 can be provided based on supported watch functions and associated programming needs. In some embodiments, some of the control switches 240-243 can be located asymmetrically on a side of watch 20. In some embodiments, a majority or all of control switches 240-243 can be located on one side of the watch. For example, three or more of switches 240-243 could be arranged along side 20 while remaining switches 240-243 (if any) can be placed on side 202.

Typically, each of control switches 240-243 is assigned at least one function. In certain embodiments, the functionality of some of control switches 240-243 is consistently defined across multiple worlds. For example, in many embodiments, a mode control switch is defined that causes the watch to enter a configuration menu. The configuration menu is typically used to set operating parameters and to calibrate functions of the watch. In one example, an alarm clock may be programmed to trigger an alarm at a predetermined time, whereby the alarm may sound a user-selected sound. In the example, the time of alarm and sound selection can be provided by the wearer using a configuration menu. In certain embodiments, the configuration menus associated with the modes of operation for a given world are uniquely accessible in that world and, preferably, transition between worlds is uniquely controlled by a single switching device such as a manipulable bezel which can engage and activate any one of a plurality of switches corresponding to separate worlds in order to select such world.

In certain embodiments, bezel 22 can be manipulated to select a desired world. Upon selecting a world, the watch 20 typically performs the functions and operations associated with the selected world. Previous functions and operations associated with the prior world can be terminated, but many functions and operations may be performed as background or hidden functions and operations. For example, configuration menus are typically abandoned upon transition between worlds but alarm functions can continue to operate even after switching worlds. Thus, an alarm can be triggered while the watch is configured to operate in a world other than the TIME world and, in at least some embodiments, display and sound notifications can be made in the other world. For example, in SPEED world, a flashing indicator accompanied by a distinctive tone can be used to indicate that an alarm was triggered.

In certain embodiments, operation of the watch is controlled according to characteristics configured for a currently selected world. Typically, the watch 20 operates as an apparent single function watch, exhibiting characteristics and behaviors associated with the single function. Display, input switches and control devices may be reconfigured or redefined to support such apparent single function operation. Typically, navigation between worlds through world menus is prevented and world transitions can be effected only by switching the watch operation to the desired world. To this end, a configuration menu is typically defined for each world and each control menu may be navigated using control switches 240-243.

In some embodiments, control switches 240-243 may be assigned functionalities other than configuration functions. Typically, control switches 240-243 may be reconfigured to obtain watch response, display and operational characteristics that appear to be consistent with a single function watch. For example, a start/stop control switch has utility in a stopwatch but a compass may not require a switch that starts or stops any of its functions. In this latter example, a start/stop control switch could be optionally disabled or redefined during world transition.

Figure 3A:
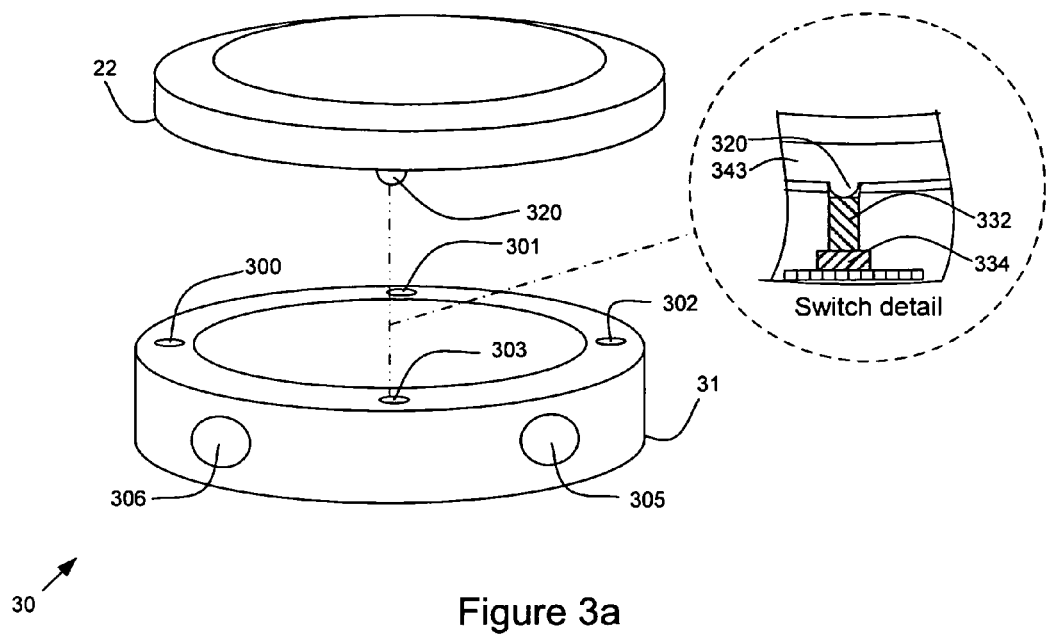
FIGS. 3a and 3b illustrates relative locations of switches and operation of a bezel in embodiments of the invention.

In certain embodiments, a watch bezel 22 may be used to select between worlds. In some embodiments, watch bezel 22 is rotatable and adapted to activate one or more function switches based on the orientation of the watch bezel 22. The example illustrated in FIG. 3a depicts one embodiment in which a watch, depicted generally at 30, comprises a rotatable annular bezel 22 with at least one protuberance 320 for activating control switches 334 accessed through one or more recesses 300, 301, 302 and 303 in watch body 31. In some embodiments, switch 334 may be directly activated by protuberance 320. In the example, protuberance 320 can be formed as a generally spherical, conical or cylindrical protrusion or post such that when the protuberance 320 is aligned above recess 303, protuberance 320 penetrates recess 303 and activates switch 334. In certain embodiments, protuberance 320 can be formed on an insert 343 attached to bezel 22 where the insert 343 can be manufactured from any suitable material, including various metals as well as nylons or other plastics. In some embodiments, protuberance 320 activates switch 334 using a pusher 332 provided generally within recess 303.

Activation of switch 303 may be effected by direct electrical contact between protuberance 320 and one or more electrical contacts (not shown). In some embodiments, protuberance 320 can cause mechanically activation of a pushbutton or other mechanically operated switch. In some embodiments, protuberance 320 can be constructed of a material providing sufficient magnetic field to activate a reed switch, relay, hall-effect switch or the like. In some embodiments, protuberance 320 can cause switch activation by altering a combination of capacitive, inductive and resistive characteristics of the switch 334. In certain embodiments, protuberance 320 may be constructed to resist rotation of the bezel when protuberance 320 engages one of the control switch recesses 300-303 such that bezel 22 can be retained or locked in position relative to the watch face. In some embodiments, one or more additional protuberances (not shown) can be provided for bezel lock or stabilization.

Figure 3B:
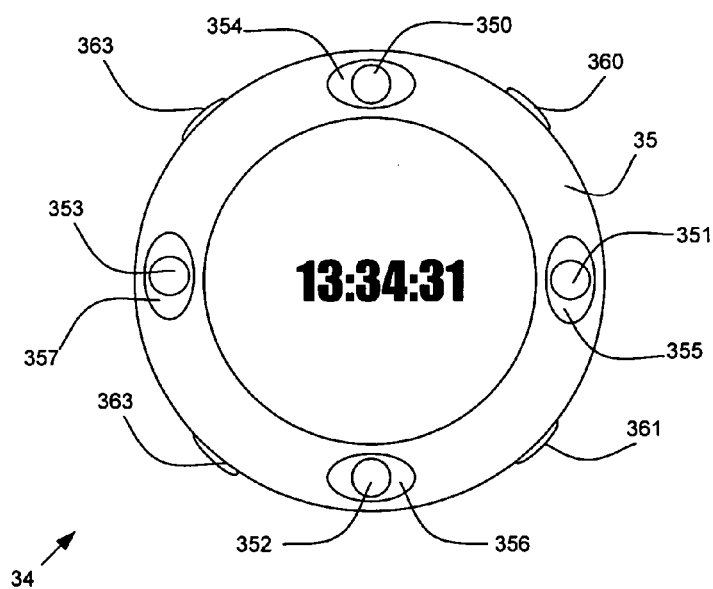

Referring now to FIG. 3b, in certain embodiments, a watch 34 can be provided with fixed bezel 35 and additional function-select or world-select switches 350, 351, 352 and 353. Typically switches 350-353 are provided using pushbutton switches, although other types of switch may be employed, including capacitive switches and transducers adapted to detect pressure on the bezel. In some embodiments, a non-rotatable bezel 35 is provided that transmits a force to switches 350-353 deployed below designated pressure points 354, 355, 356 and 357 identified on the bezel 35. In some embodiments, switches 350-353 can be mechanically activated using a tilting, rocking or deformable bezel 35.

In certain embodiments, switches for selecting watch world are positioned at even angular spacing around the watch dial. In the example of FIG. 2, when positional indicator 220 is located at the top of the watch 20 (that is, at 0° rotation), the watch may function, for example, as a timepiece. When the positional indicator 220 is rotated through 90° clockwise to a second position on the watch 202, the watch may, for example, function in RIDE mode. In the watch 20 of FIG. 2, four locations are defined at which bezel 22 may be engaged located approximately at the 12 o'clock, 3 o'clock, 6 o'clock and 9 o'clock positions. It will be appreciated that the number and location of rest positions provided for the bezel in any embodiment depends upon factors including the number of functional components provided in the watch, ergonomics and designer preferences.

In many embodiments, bezel 22 includes an indicator for identifying which operating function of the watch is currently selected. Identification of function can be made by any suitable visual and tactile means. Visual indication can be provided by using a combination of markings on bezel 22, watch body, watch crystal and watch face. In the example, functions of watch 20 are marked on the watch crystal as TIME, RIDE, COMP (compass) and SPEED. In some embodiments, the bezel can be shaped to include a pointer that indicates current function.

Referring also to FIG. 1, in many embodiments, the multifunction watch 20 may include instruments 17, including barometers, compasses, real time clocks, accelerometers, GPS systems, measuring devices and calculators configured to provide information used by one or more watch worlds. For example, the SPEED function may use an accelerometer, a real time clock and a barometer to calculate a speed of descent. Instruments 17 can be configured using one or more configuration devices 13 including, for example, one or more mode switches, selector switches and start/stop switches. In some embodiments, rotatable input devices, including wheels, trackballs, sensitive pads, keypads and conventional watch winders may be incorporated and adapted for configuration and operation of the watch and its instruments.

In certain embodiments, some characteristics of each of the configuration devices 13 can be commonly shared in all watch worlds. Typically, configuration devices 13 can be used to manage functionality of the watch within a current world. For example, a start/stop switch 242 may be used to start a timer in TIME mode and, in SPEED mode, the start/stop switch 242 can be used can be used to begin calculation of an average speed. In the multifunction watch example depicted in FIG. 2, four control switches are provided, including light control 240, mode/set 241, start/stop 242 and lap/reset 243. FIG. 7 shows typical control matrices for a four world watch having characteristics similar to those provided in the example depicted in FIG. 2. It is contemplated that the number and location of both world select 12 and configuration 13 control switches/devices as well as corresponding assignments of functionality can be varied as necessary to provide desired operational characteristics and in view of factors such as ergonomic design. However, for the purposes of this discussion, an example of a watch will be described in more detail where the watch is constructed with features similar to those in the example of FIG. 2 and operating in a manner described in FIG. 7.

In certain embodiments, a plurality of configuration menus is provided for configuring corresponding watch worlds. Menus are typically hierarchical, allowing navigation through options provided one level until an option is selected which can lead to another level of options or can cause an action to be taken. Actions may include enabling or disabling features, setting variables and initiating operations. Navigation within each of the configuration menus is typically independent of navigation within the other configuration menus.

Figure 4:
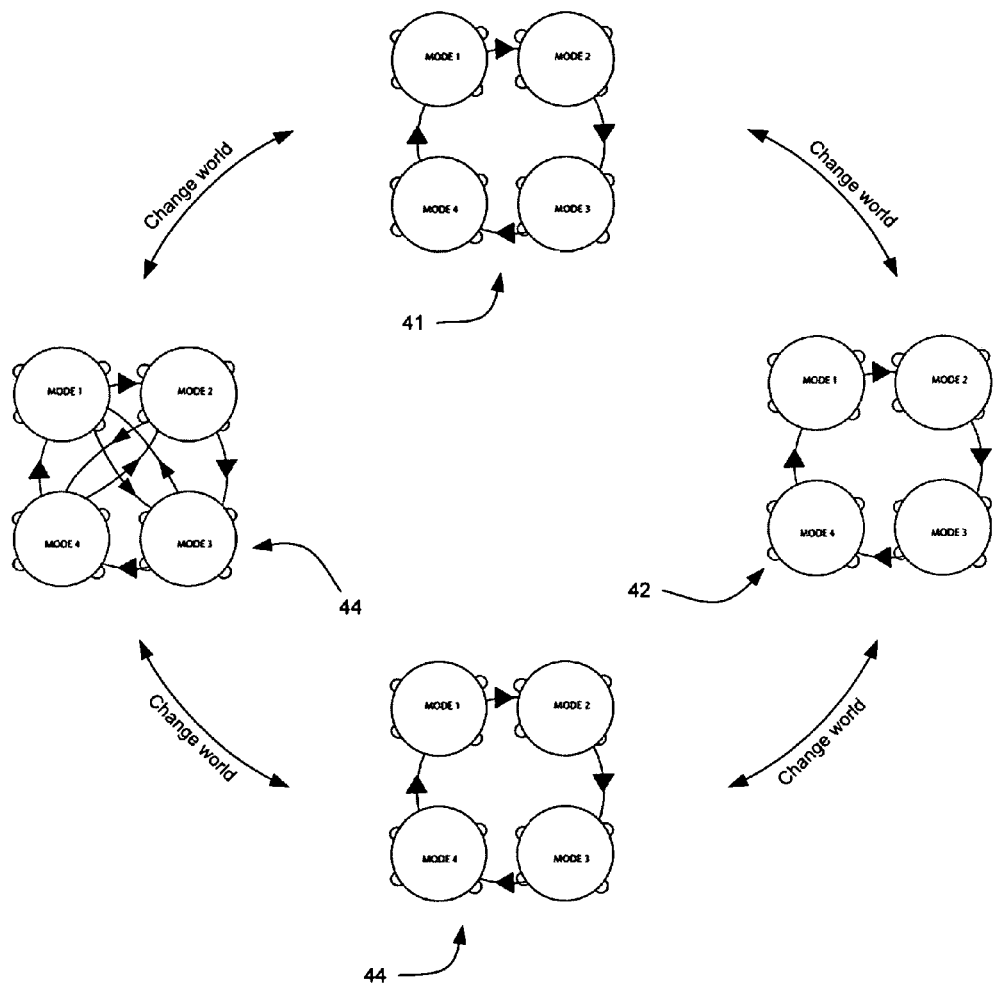
FIG. 4 illustrates distinct menus within worlds.

Referring to FIG. 4, cyclic menus and interconnected menus can be implemented as needed to support the operation of the various worlds 41, 42, 43, 44. In FIG. 4, top level menus for four worlds 41, 42, 43, 44 are illustrated in which the menus are cyclic for worlds 41, 42 and 43 and interconnected for world 44. In a cyclic menu, menu options are accessed sequentially; in some embodiments, forward and backward navigation is supported. In interconnected menus, certain options may be accessed from multiple locations and non-sequential jumps between options may be supported.

Each menu may define a single menu root from which configuration submenus enable specific configuration activities within a currently selected world. In some embodiments, it may be desirable within one or more worlds to commence all configuration activity at the corresponding menu root. However, a menu structure can be provided with some degree of persistence such that the configuration menu can be exited at a certain location and configuration recommenced at the selected location upon reentry to the menu structure. Persistence can be time limited such that return to the configuration menu must occur within a predetermined time of exit from the configuration menu. In some embodiments, persistence may also be destroyed upon change of worlds.

In one example of menu persistence, a watch may be configured to function as a stopwatch within the timepiece world whereby the stopwatch offers more features than can be controlled by mode or configuration switches. Such would be the case when multiple timers can be enabled with split time capability. In this example, menu reentry may be desirable to control operation of the multiple timers by selecting one of the multiple timers to be initialized, started, stopped or paused. Some embodiments ease the management of this type of operation by allowing exit from a place in the menu structure and reentry to the same place.

In certain embodiments, functional persistence is provided between worlds. Functional persistence enables operations of watch worlds to continue even when other worlds are currently selected. A basic example involves the operation of a timepiece world. When selected, timepiece world causes display of common watch functions including time of day, calendar, timer, alarm, chronograph, and so on. Additionally, initiation of configuration by selecting a mode switch may initiate a menu display that permits configuration of the timepiece mode. This configuration can include setting time of day, date and so on. Menu options may configure the watch to function as a stopwatch within the timepiece world. After initiating the stopwatch, other worlds may be selected without affecting operation of the timepiece primary functions, operations and features. Thus, time of day will typically be maintained regardless of world selection. Additionally, a stopwatch operation may be continued and alarms remain active while other worlds are selected.

In many embodiments, control of display is maintained by the currently selected world. In some embodiments, a mode of operation within a world can control a portion or all of the display. However, it may be desirable to allow other worlds to modify, interrupt or otherwise alter the display. For example, alarms triggered in the timepiece may cause a display change in all other worlds accompanied by a preselected audio alarm. This display change may cause an icon to be displayed or temporary overwrite of a portion of the display. In some embodiments; some watch functions can cause information to be displayed in other worlds for a desired period of time or indefinitely. For example, time of day may be prominently display in TIME world while other worlds may allocate a portion of the display to show current time.

In many embodiments, the multifunctional watch 20 can be configured to function as any of a plurality of watch types. For example, TIME world can be selected and configured as a basic time display, with date information for one or more time zones. The watch 20 may also be configurable to operate as a chronograph. While operating as a timepiece, activation of mode/set 241 typically initiates a configuration menu that permits a user to set time, date, alarm and other relevant information. As described above, Time World can be initiated in many embodiments by rotating or otherwise manipulating the watch bezel. Similarly, "Ride World, "Compass World" and "Speed World" will be used to refer to watch operating environments described in the examples above.

Figure 5:
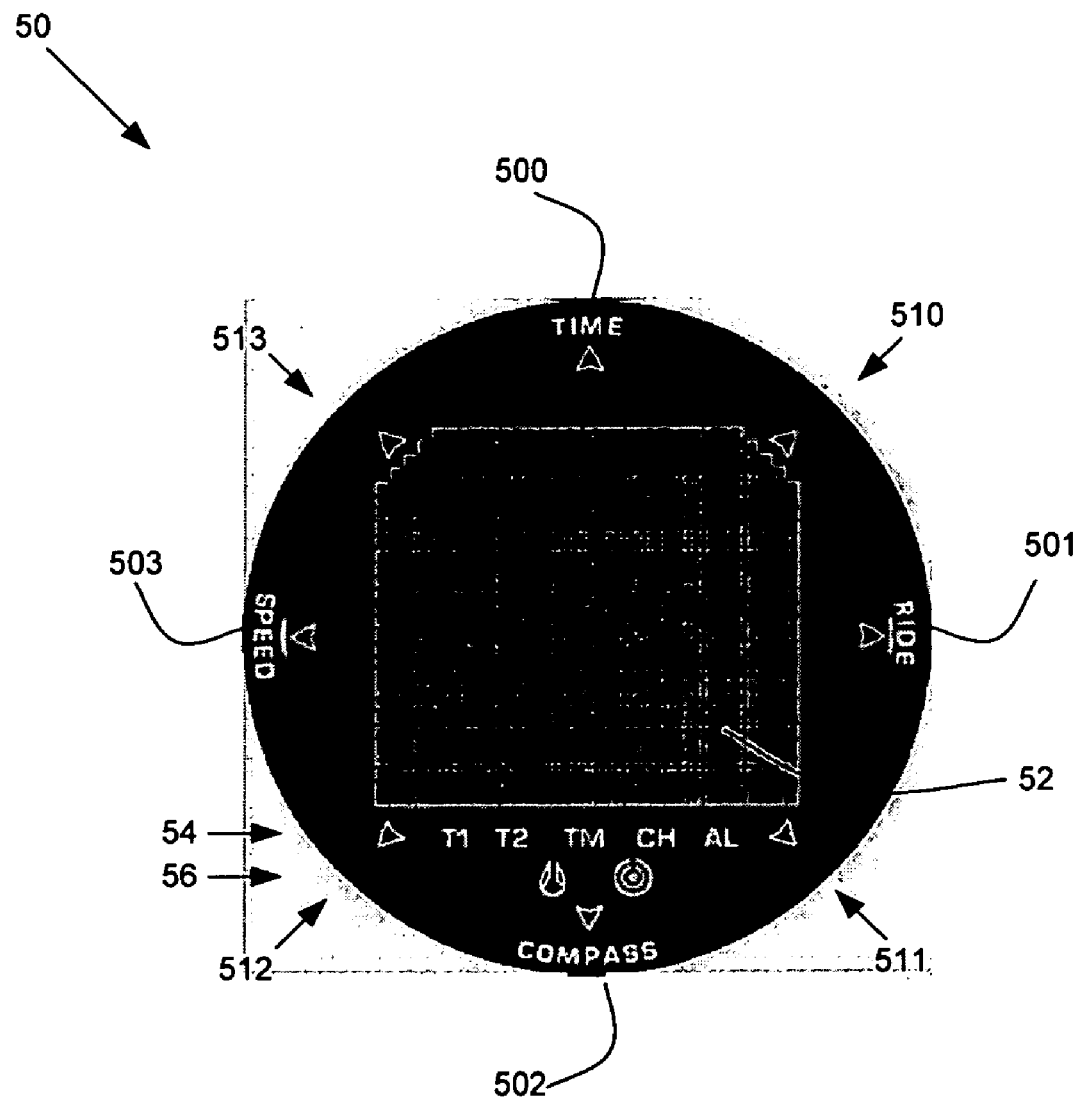
FIG. 5 depicts a display provided in one embodiment of the invention.

Referring now to FIG. 5, the display of multifunction watch 50 can convey information in a plurality of forms. In certain embodiments, a graphics display area 52 is provided to display text and graphics generated by the watch functional components. In some embodiments, the display 50 may also display bezel setting information indication for example TIME 500, RIDE 501, COMPASS 502 and SPEED 503 world engagement or selection points. In some embodiments, the active world 500-503 can be highlighted in color, brightness, size, by being turned on or by other suitable means. The status of a plurality of common watch functions or operations may be indicated by symbols 54, the functions or operations including timers, Time, Chrono and alarm. Likewise, world-specific indicators 56 may indicate that attention is needed in the operation of a world other than that currently selected. Mode and configuration switches can be identified by indicators 510, 511, 512 and 513. It will be appreciated that other display elements can include compass points (N, S, E, W, etc,), speed and altitude indicators and other useful indicators.

Figure 6:
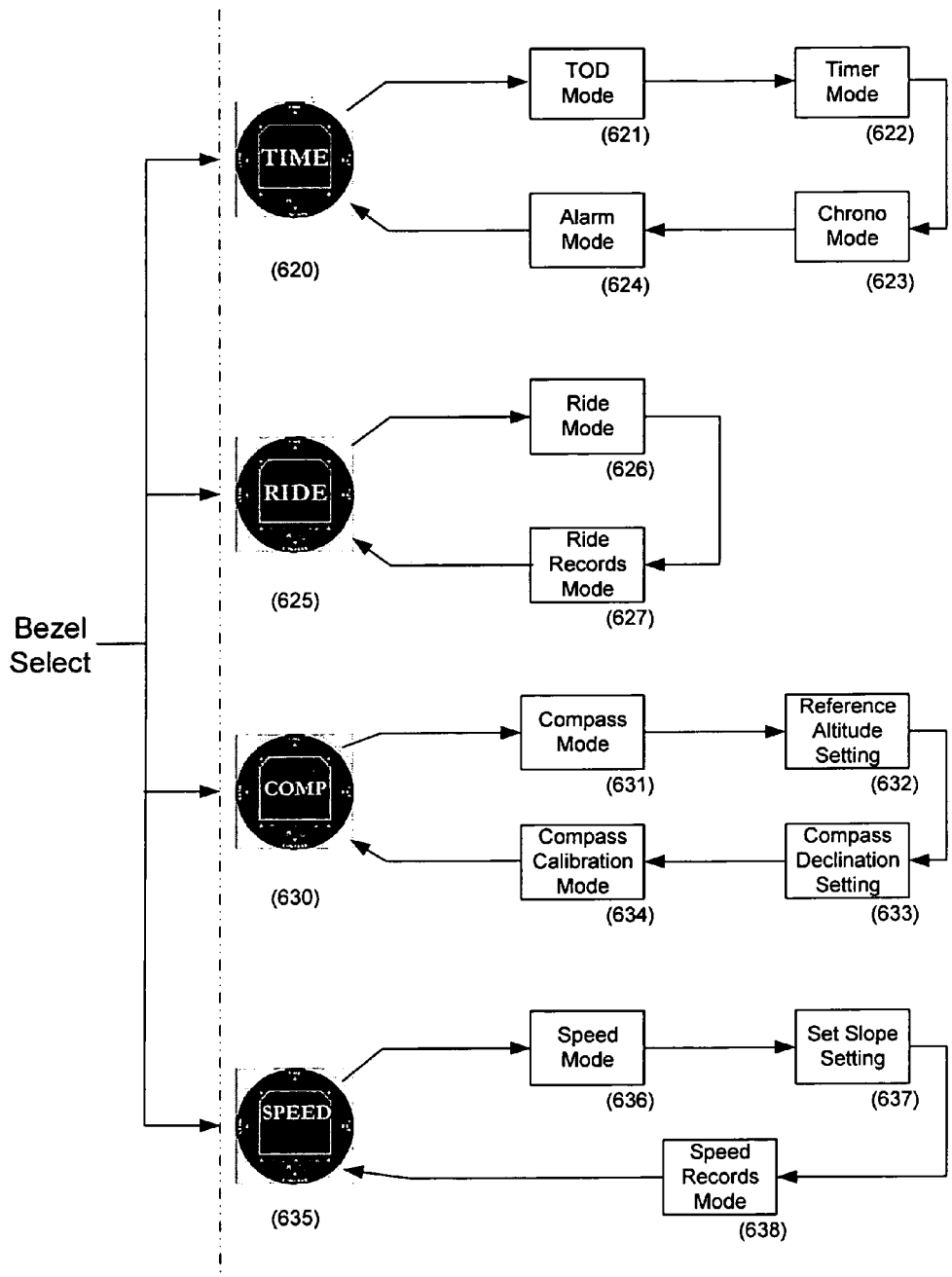
FIG. 6 shows a top level menu structure provided by certain embodiments of the invention.

Referring now to FIG. 6, an example of a top level menu structure is provided. In the example, two levels of selection are defined: bezel switch selection 60 for choosing a current world and menu navigation 62 for traversing the menu within a world. In the TIME world 620, a mode switch is typically operated to sequentially review options in a loop fashion. Thus options to set time of day 621, configure one or more timers 622, configure chronograph mode 623 and set an alarm 624 can be selected.

In the RIDE world, 625, a mode switch selects between options including configuration of RIDE mode operation 626 and for managing or viewing RIDE mode records 627. In COMPASS world 630, typical options include COMPASS configuration 631, establishing a reference altitude 632, setting compass declination 633 and calibration 634. In SPEED world 635, menu options typically include config-uring speed mode 636, setting slope parameters 637 and managing and displaying speed records 638. Selection of any option typically passes control to a submenu for identifying and altering configurable options or for displaying system parameters.

In many embodiments, control buttons are provided for mode and configuration selection and a bezel mechanism is provided for selecting worlds. Rotating or fixed bezels that cooperate with or identify world select switches can be used to select between plural worlds, including: TIME, RIDE, COMPASS, and SPEED worlds. A "light" button can be provided to turn on a display backlight. A Mode/Set button may be provided to perform multiple functions including changing foreground mode (e.g. select between watch and stopwatch) within a world, entering the setting mode and changing a selected setting field. A Start/Stop/+ button may be provided for starting or stopping an operation, functional unit or application and for incrementing the value of a selected parameter or setting field. A Lap/Reset/− button can be used to record a lap time, to reset a chrono or timer and to decrement the value of a selected parameter or setting field.

The tables provided in FIG. 7 illustrate the operation of Light button 704, mode/set button 706, start/stop+ button 708 and lap/reset/− button 710 in one example of an embodiment. The operation of the buttons is provided for TIME 72, RIDE 74, COMPASS 76 and SPEED 78 worlds and for relevant modes 700 within the worlds 72, 74, 76 and 78. Switch operations are identified, typically as "Press once" or "Hold" 702.

In certain embodiments, manipulation of predetermined combinations of watch buttons can cause partial or complete reset of one or more worlds. In particular, hard reset and soft resets can be performed, whereby a hard reset typically initiates all stored configuration and recorded data in the watch and restarts watch functions from scratch while a soft reset typically restarts watch functions from scratch while preserving certain configuration and recorded data. In some embodiments, a hard reset is performed by closing a special reset switch. In some embodiments, a hard reset applies to only a current world while, in other embodiments, hard reset may affect one or more worlds. A soft reset is typically performed by depressing a combination of keys simultaneously for a period of time, e.g.: by depressing the LIGHT, MODE/SET, START/STOP/+, and the LAP/RESET/− buttons for 5 seconds. In one example, after reset the watch generates a button beep to confirm Piezo operation, turns on all LCD segments in the display, turns on EL display for 2 seconds, turns off all LCD segments and EL, displays configuration information including software version number and displays the default mode of the current function pointed to by the rotating bezel.

In certain embodiments a multimode watch provides a plurality of modes of operation including time of day, timer, chrono, alarm, ride, compass and speed. In some embodiments modes including Ride, Compass and Speed modes are accessible by means of a bezel. In many embodiments, the bezel is adapted to rotate and engage at least one switch at predetermined locations on the periphery of the watch. In some embodiments, operation of the rotating bezel is processed with higher priority than other watch switches by a processor provided in the watch.

Additional Descriptions:

In TIME world, embodiments of the watch support features including:

Hours, minutes, and second display in 12 Hr or 24 Hr format.

Automatically determines the day of week based on the date of the current time zone.

Automatic leap year handling.

Two-time zones with hours, minutes, month, day and year settings.

100 Year Auto Calendar (1 Jan. 2000-31 Dec. 2099)

Timers having one-second resolution up to 24 hours.

Timers settable to any of three modes: countdown-stop, countdown-repeat, countdown-up.

Chronographs having 1/100-second resolution up to one hour; one-second resolution up to 100 hours.

Chronographs having lap or split time display

Three (3) independent alarms, whereby each alarm is settable to any of three (3) types:

daily, weekly, or yearly.

In RIDE world embodiments of the watch comprise one or more built-in 100-hour chronographs.

whereby the one or more chronographs count a number of altitude transitions.

whereby the one or more chronographs determine a maximum change in altitude.

whereby the one or more chronographs calculate and store an average change in altitude In COMPASS world embodiments of the watch have a read range from 0° to 359° and, in some embodiments, a 1° resolution.

In SPEED mode embodiments of the watch comprise components that

Calculate the actual speed considering the set angle and the vertical speed

Detect the slope

In one example, a multifunction watch comprises a bezel operative to select a watch function, a processor for controlling watch operation, an electro-luminescent (EL) backlight, an LCD Display, a plurality of buttons having operations assigned including LIGHT, MODE/SET, START/STOP/+, LAP/RESET/−. In some of these embodiments, the bezel is rotatable for easy access of major watch functions. In some of these embodiments, the bezel is adapted to activate or actuate one of a plurality of switches for selecting the watch function.

In many embodiments, watch operations in each world is distinct and separate. In these embodiments, configuration of each world can only be reached when the associated functionality is selected, typically through manipulation of the bezel. A change of worlds from a first world to a second world during configuration in the first world may cause abandonment of any incomplete changes.

In certain embodiments, multifunction watch 20 includes a display light that facilitates viewing of the watch face. The watch face is typically provided as an electronic display. In certain embodiments, the electronic display includes a liquid crystal display ("LCD") portion and light control causes backlight illumination of the LCD display. In some embodiments, the electronic displays includes a light emitting display portion using technology such as light emitting diode or electroluminescent light, and control 240 can be used to adjust light intensity emitted by the electronic display.

Although the present invention has been particularly described with reference to embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagrams. It is intended that the appended claims include such changes and modifications.

What is claimed is:

1. A multifunction watch comprising
   a processor adapted to provide a plurality of worlds, each world defining one or more modes of operation of the watch,
   a bezel adapted to cooperate with one or more switches to select a current world from the plurality of worlds, and
   a watch display maintained by at least one of the modes of operation defined by the current world.

2. The multifunction watch of claim 1, wherein the processor maintains a different configuration for each world.

3. The multifunction watch of claim 2, and further comprising a plurality of controls for selecting options from a menu provided by the current world.

4. The multifunction watch of claim 3, wherein the options are operative to modify the configuration of the current world.

5. The multifunction watch of claim 3, wherein the plurality of controls include a mode switch for selecting one of the modes of operation defined by the current world and at least one switch for navigating one or more submenus and selecting options presented in the menu and submenus.

6. The multifunction watch of claim 2, wherein the processor maintains a configuration for controlling operations common to all of the plurality of worlds.

7. The multifunction watch of claim 1, wherein the bezel is rotatable and the current world is selected based on bezel position.

8. The multifunction watch of claim 1, wherein the one or more switches are provided at desired locations relative to the bezel and the current world is selected by activating a corresponding switch.

9. The multifunction watch of claim 1, wherein the plurality of worlds includes a TIME world providing time related information, a SPEED world providing information associated with a measured speed, a COMPASS world providing directional information and a RIDE world providing information including duration, altitude and speed associated for one or more trips.

10. A method for providing multiple functions in a watch, comprising
    providing two or more worlds, each world having a different configuration defining display and functional characteristics of the each world,
    receiving an indication identifying one of the two or more worlds,
    performing at least one function consistent with the functional characteristics of the identified world, and
    providing a display consistent with the display characteristics of the identified world.

11. The method of claim 10, wherein the indication is provided by activating a switch associated with the identified world.

12. The method of claim 11, wherein activating the switch includes orienting a rotatable bezel.

13. The method of claim 10, wherein at least some of the characteristics of the identified world are configured using a menu reserved for the identified world.

14. The method of claim 13, wherein the menu reserved for the identified world is distinct from menus reserved for the other worlds.

15. A multifunction watch comprising
- a bezel adapted to cooperate with one or more switches to identify a current world from at least two worlds, wherein each world comprises a plurality of functions,
- one or more instruments configured to provide measurements to the current world, and
- a processor for processing the measurements using at least one function and providing information related to the measurements to a display for displaying the information according to a format determined by the current world.

16. The multifunction watch of claim 15, wherein at least some characteristics of each world are distinct from characteristics of the other worlds.

17. The multifunction watch of claim 16, wherein characteristics of the current world are configurable using a menu provided in the current world.

18. The multifunction watch of claim 17, and further comprising a plurality of controls for configuring the characteristics of the current world.

19. The multifunction watch of claim 18, wherein the controls are electrical switches.

20. The multifunction watch of claim 19, wherein the controls include a mode switch, a start switch and a stop switch.

21. The multifunction watch of claim 19, wherein the controls include a mode switch and at least one menu navigation switch.

22. The multifunction watch of claim 21, wherein the bezel is rotatable and the current world is identified based on bezel position.

23. The multifunction watch of claim 22, wherein the bezel includes an actuator and the current world is identified when the actuator engages one of the one or more switches associated with the current world.

24. The multifunction watch of claim 21, wherein the one or more switches are provided at desired locations on the bezel and the current world is identified by activating a corresponding switch.

* * * * *